(12) United States Patent  (10) Patent No.: US 8,766,941 B2
Pan  (45) Date of Patent: Jul. 1, 2014

(54) DISPLAY DEVICE WITH ON-SCREEN DISPLAY MENU FUNCTION

(75) Inventor: Chien-Hua Pan, New Taipei (TW)

(73) Assignee: Wistron Corporation, New Taipei (TW)

( * ) Notice: Subject to any disclaimer, the term of this patent is extended or adjusted under 35 U.S.C. 154(b) by 185 days.

(21) Appl. No.: 13/491,603

(22) Filed: Jun. 8, 2012

(65) Prior Publication Data

US 2013/0027328 A1 Jan. 31, 2013

(30) Foreign Application Priority Data

Jul. 28, 2011 (TW) .............................. 100126799 A

(51) Int. Cl.
*G06F 3/041* (2006.01)
(52) U.S. Cl.
USPC ........... 345/173; 345/204; 348/563; 348/564; 348/569; 715/700
(58) Field of Classification Search
USPC .................. 345/173, 204; 348/563, 564, 569; 715/700
See application file for complete search history.

(56) References Cited

U.S. PATENT DOCUMENTS

| | | | |
|---|---|---|---|
| 6,845,277 B1 | 1/2005 | Michelet et al. | |
| 2002/0167610 A1* | 11/2002 | Oh | 348/554 |
| 2004/0056848 A1* | 3/2004 | Sasaki | 345/173 |
| 2006/0026521 A1 | 2/2006 | Hotelling et al. | |
| 2006/0097994 A1* | 5/2006 | Miyakoshi | 345/173 |
| 2008/0106526 A1 | 5/2008 | Chen | |
| 2008/0150923 A1 | 6/2008 | Chen | |
| 2009/0160779 A1 | 6/2009 | Crockett et al. | |
| 2009/0300232 A1 | 12/2009 | Chen | |
| 2010/0064261 A1 | 3/2010 | Andrews et al. | |
| 2011/0060987 A1* | 3/2011 | Huang | 715/702 |

FOREIGN PATENT DOCUMENTS

EP 2256590 12/2010

OTHER PUBLICATIONS

"Office Action of Taiwan Counterpart Application", issued on Jan. 7, 2014, with English translation thereof, pp. 1-13.

* cited by examiner

*Primary Examiner* — Koosha Sharifi-Tafreshi
(74) *Attorney, Agent, or Firm* — Jianq Chyun IP Office

(57) ABSTRACT

A display device having an on-screen display (OSD) menu function is provided, which includes a touch display panel, a touch screen controller, a display circuit, and a multiplexer. The touch display panel includes a display layer and a touch layer. The touch screen controller detects the touch layer and outputs a first detection result. The display circuit displays a first image of a first image source on the display layer, and the display circuit has the OSD menu function. In a normal display mode, the multiplexer transmits the first detection result of the touch screen controller to the first image source. If the first detection result complies with a predetermined pattern, the OSD menu function of the display circuit is triggered, and the display circuit enters a screen adjustment mode, and the multiplexer transmits the first detection result of the touch screen controller to the display circuit.

19 Claims, 4 Drawing Sheets

DISPLAY DEVICE WITH ON-SCREEN DISPLAY MENU FUNCTION

CROSS-REFERENCE TO RELATED APPLICATION

This application claims the priority benefit of Taiwan application serial no. 100126799, filed on Jul. 28, 2011. The entirety of the above-mentioned patent application is hereby incorporated by reference herein and made a part of this specification.

BACKGROUND OF THE DISCLOSURE

1. Field of the Disclosure

The disclosure relates to a display device. Particularly, the disclosure relates to a display device having an on-screen display (OSD) menu function.

2. Description of Related Art

To ensure a comfortable visual enjoyment, a display device is generally designed to have an on-screen display (OSD) menu function to display image characteristic parameters on a screen. In this way, a user can select a parameter to be adjusted according to an actual demand, for example, brightness, a frame size, a sound volume, etc. In the operation of adjusting the parameters, physical keys of the existing display device are generally used to control an OSD menu on an image. However, with development of technology, functions of the display device are gradually increased, which results in a fact that the number and complexity of the physical keys on the display device are increased. Moreover, it is relatively complicated in operation by using the physical keys to select or set functional options of the display device, and is easy to cause inconvenience in utilization. Moreover, configuration of the physical keys occupies a hardware space of the display device.

How to resolve the problem of the conventional technique that the physical keys are used to operate the OSD menu is an important issue to be developed.

SUMMARY OF THE DISCLOSURE

Accordingly, the disclosure is directed to a display device to resolve the problem mentioned in the related art.

The disclosure provides a display device, in which an on-screen display (OSD) menu function of a display circuit is triggered by detecting a touch display panel, and various parameters of the OSD menu function are set by detecting the touch display panel, so as to reduce the number of physical keys.

The disclosure provides a display device having an on-screen display (OSD) menu function, which includes a touch display panel, a touch screen controller, a display circuit, and a multiplexer. The touch display panel includes a display layer and a touch layer. The touch screen controller is coupled to the touch display panel to detect the touch layer and output a first detection result. The display circuit is coupled to the touch display panel to display a first image of a first image source on the display layer, where the display circuit has the OSD menu function. The multiplexer is coupled between the display circuit and the touch screen controller. In a normal display mode, the multiplexer transmits the first detection result of the touch screen controller to the first image source. When the first detection result complies with a predetermined pattern, the OSD menu function of the display circuit is triggered to enter a screen adjustment mode, and the multiplexer transmits the first detection result of the touch screen controller to the display circuit.

In an embodiment of the disclosure, the first image source is an external host, and in the normal display mode, the external host receives the first detection result of the touch screen controller through the multiplexer and provides the first image. When the first detection result complies with the predetermined pattern, the external host sends a command to trigger the OSD menu function of the display circuit.

In an embodiment of the disclosure, the display device further includes a microprocessor. The microprocessor is coupled to the display circuit to serve as the first image source. In the normal display mode, the microprocessor receives the first detection result of the touch screen controller through the multiplexer and executes an operating system to provide the first image. When the first detection result complies with the predetermined pattern, the microprocessor sends a command to trigger the OSD menu function of the display circuit.

In an embodiment of the disclosure, the display device further includes a microprocessor. The microprocessor is coupled to the display circuit to serve as the first image source. The display circuit selects to display the first image of the first image source or a second image of an external host on the display layer. In the normal display mode, when the display circuit selects to display the first image on the display layer, the microprocessor receives the first detection result of the touch screen controller through the multiplexer and executes an operating system to provide the first image. In the normal display mode, when the display circuit selects to display the second image on the display layer, the external host receives the first detection result of the touch screen controller through the multiplexer and provides the second image.

In an embodiment of the disclosure, the display device further includes a gesture determination circuit. The gesture determination circuit is coupled between the touch screen controller and the display circuit. The gesture determination circuit determines whether the first detection result complies with the predetermined pattern, and when the first detection result complies with the predetermined pattern, the gesture determination circuit sends a command to trigger the OSD menu function of the display circuit.

In an embodiment of the disclosure, in the screen adjustment mode, the display circuit triggers a parameter command according to a second detection result output by the touch screen controller, so as to adjust options displayed by the OSD menu function or select to display the first image of the first image source or a second image of the external host on the display layer.

In an embodiment of the disclosure, the parameter command is to adjust a brightness parameter, a contrast parameter, an image position adjusting parameter, a color parameter, a display frequency adjusting parameter or a signal source input port switching parameter.

In an embodiment of the disclosure, in the screen adjustment mode, when the display circuit learns that a user does not touch the touch display panel for a predetermined time according to a second detection result output by the touch screen controller, the display circuit closes the OSD menu function to enter the normal display mode.

In an embodiment of the disclosure, the display device is a smart television (TV) or a smart monitor having an Internet function.

According to the above descriptions, the display device of the disclosure triggers the OSD menu function of the display circuit according to the detection result of the touch display panel to enter the screen adjustment mode, and sets various parameters of the OSD menu function according to the detection result of the touch display panel, so that configuration of OSD physical keys is unnecessary. Therefore, the operation flow is simplified, and operation inconvenience is avoided. In this way, the physical keys are reduced to simplify a fabrication flow, and hardware space and fabrication cost are saved.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
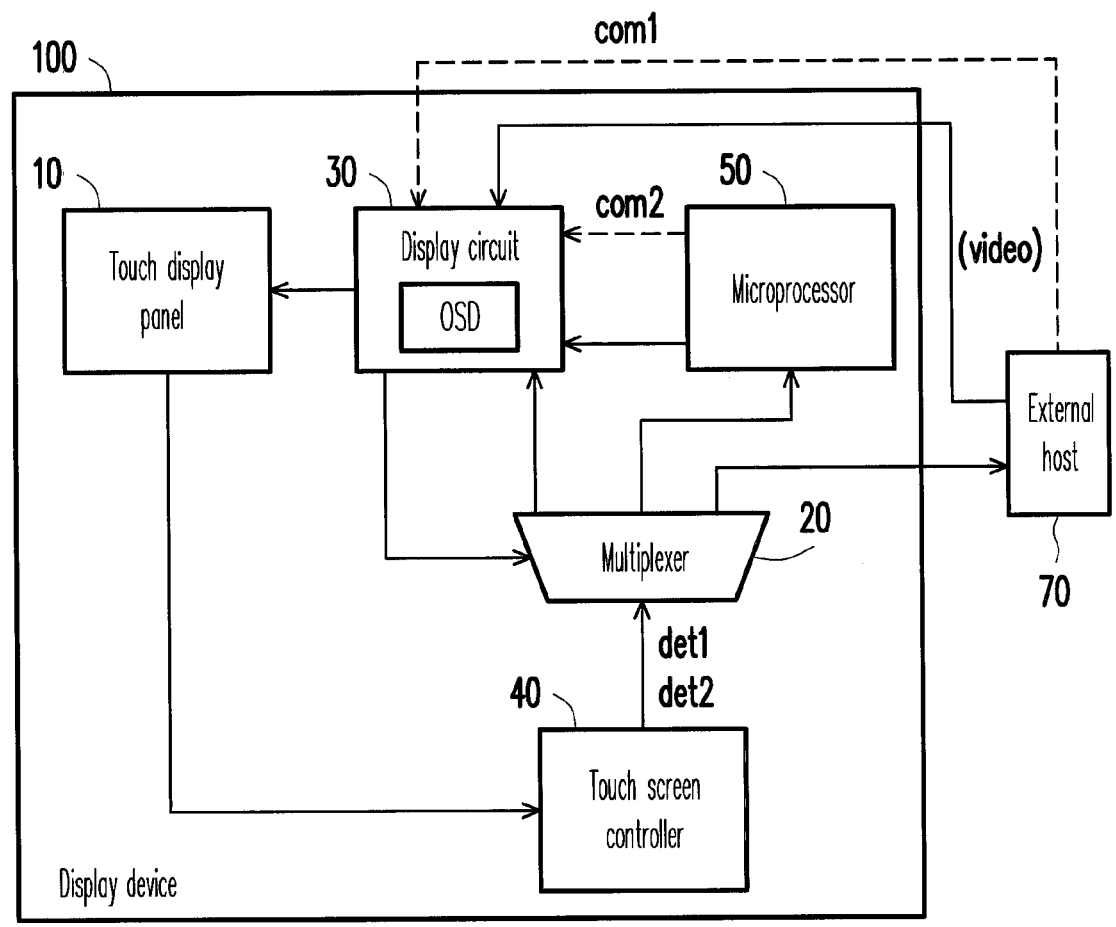
FIG. 1 is a block diagram of a display device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

In the following embodiments, when "A" device is referred to be "connected" or "coupled" to "B" device, the "A" device can be directly connected or coupled to the "B" device, or other devices probably exist there between. Comparatively, when the "A" device is referred to be "directly connected" or "directly coupled" to the "B" device, none other device exits there between.

FIG. 1 is a block diagram of a display device according to an embodiment of the disclosure. Referring to FIG. 1, the display device 100 may include a touch display panel 10, a multiplexer 20, a display circuit 30 and a touch screen controller 40. The touch display panel 10 may include a display layer and a touch layer, wherein the touch layer is stacked on the display layer. The display circuit 30 is coupled to the display layer of the touch display panel 10. The display circuit 30 may include a scalar, a timing controller, a display panel driver and/or other display control circuit. The display circuit 30 can display a first image of a first image source on the display layer. The display circuit 30 further has a related circuit of an on-screen display (OSD) menu function. The display circuit 30 can display an OSD menu on the touch display panel 10 to facilitate a user to adjust control parameters of the display device 100. The multiplexer 20 can be coupled to the display circuit 30, the touch screen controller 40 and a microprocessor 50. The touch screen controller 40 detects whether the touch layer on the touch display panel 10 is touched, and obtains detection results (for example, detection results det1 and det2) of a touch area on the touch display panel 10. The detection results det1 and det2 in FIG. 1 are respectively detection results obtained when the touch screen controller 40 detects the touch display panel 10 at different time.

In a normal display mode, the multiplexer 20 transmits the first detection result det1 of the touch screen controller 40 to the first image source. When the first detection result det1 complies with a predetermined pattern, the OSD menu function of the display circuit 30 is triggered to enter a screen adjustment mode. The predetermined pattern can be two continuous touches on a specific touch area or a circle drawn on the touch display panel 10, which is not limited by the disclosure.

The first image source may have at least three variations. The first variation is an external host 70, the second variation is the microprocessor 50 in internal of the display device 100, and the third variation is to dynamically select the microprocessor 50 in internal of the display device 100 or the external host 70 to serve as the first image source.

Regarding the first variation of the first image source, the first image source is the external host 70. In case of the first variation, the microprocessor 50 can be omitted according to a design requirement. In the normal display mode, the multiplexer 20 selects to transmit the first detection result det1 of the touch screen controller 40 to the external host 70 under control of the display circuit 30. The external host 70 receives the first detection result det1 of the touch screen controller 40 through the multiplexer 20, and provides the first image to the display circuit 30. The external host 70 can continually interpret the detection results output by the touch screen controller 40. When the external host 70 discovers that the first detection result det1 complies with the predetermined pattern, the external host 70 sends a command com1 to trigger the OSD menu function of the display circuit 30. A method of determining the predetermined pattern is to execute recognition software on the external host 70 to determine whether the first detection result det1 complies with the predetermined pattern. When the OSD menu function of the display circuit 30 is triggered, the display circuit 30 enters the screen adjustment mode, and the multiplexer 20 selects to transmit the second detection result det2 of the touch screen controller 40 to the display circuit 30 under control of the display circuit 30. After the display circuit 30 closes the OSD menu function, the multiplexer 20 selects to transmit the second detection result det2 of the touch screen controller 40 to the external host 70 under control of the display circuit 30.

Regarding the second variation of the first image source, the display device 100 further includes the microprocessor 50. In case of the second variation, the first image source can be the microprocessor 50, and the external host 70 can be omitted according to a design requirement. The microprocessor 50 can be coupled to the display circuit 30 and the multiplexer 20. In the normal display mode, the multiplexer 20 selects to transmit the first detection result det1 of the touch screen controller 40 to the microprocessor 50 under control of the display circuit 30. The microprocessor 50 receives the first detection result det1 of the touch screen controller 40 through the multiplexer 20, and executes an operating system to provide the first image. The operating system executed by the microprocessor 50 can be the Linux operating system, though the disclosure is not limited thereto. When the microprocessor 50 discovers that the first detection result det1 complies with the predetermined pattern, the microprocessor 50 sends a command com2 to trigger the OSD menu function of the display circuit 30. Moreover, a method of determining the predetermined pattern is to execute recognition software on the microprocessor 50 to determine whether the first detection result det1 complies with the predetermined pattern.

When the OSD menu function of the display circuit 30 is triggered, the multiplexer 20 selects to transmit the second detection result det2 of the touch screen controller 40 to the display circuit 30 under control of the display circuit 30. After the display circuit 30 closes the OSD menu function, the multiplexer 20 selects to transmit the second detection result det2 of the touch screen controller 40 to the microprocessor 50 under control of the display circuit 30.

Regarding the third variation of the first image source, the display circuit 30 can display the image of the first image source on the display layer, where the first image source can be a first image of the microprocessor 50 or a second image of the external host 70, and the user can set a default configuration of the first image source to be the microprocessor 50 or the external host 70 through the OSD menu function. In the normal display mode, when the display circuit 30 selects to display the first image of the microprocessor 50 on the touch display panel 10, the multiplexer 20 selects to transmit the first detection result det1 of the touch screen controller 40 to the microprocessor 50 under control of the display circuit 30. The microprocessor 50 receives the first detection result det1 of the touch screen controller 40 through the multiplexer 20, and executes an operating system to provide the first image to the display circuit 30. In the normal display mode, when the display circuit 30 selects to display the second image of the external host 70 on the touch display panel 10, the multiplexer 20 selects to transmit the first detection result det1 of the touch screen controller 40 to the external host 70 under control of the display circuit 30. The external host 70 receives the first detection result det1 of the touch screen controller 40 through the multiplexer 20, and provides the second image to the display circuit 30. Descriptions of the other operations can refer to related descriptions of the aforementioned first variation and second variation.

According to the above descriptions, when the external host 70 or the microprocessor 50 determines that the first detection result det1 complies with the predetermined pattern, for example, complies with a gesture pattern, it sends the command com1 or the command com2 to trigger the OSD menu function of the display circuit 30 to enter the screen adjustment mode. Then, the display circuit 30 displays the OSD menu on the touch display panel 10, and the user can set the OSD menu function by performing touch/move operations on the touch display panel 10. Therefore, during a period that the OSD menu function is triggered, the touch screen controller 40 can detect the touch display panel 10 and transmit the second detection result det2 to the display circuit 30. When the user touches/moves a virtual key/scroll in the OSD menu, the display circuit 30 triggers a parameter command according to the second detection result det2 output by the touch screen controller 40 to adjust a corresponding parameter of options displayed by the OSD menu.

The parameter command is to adjust a brightness parameter, a contrast parameter, an image position adjusting parameter, a color parameter, a display frequency adjusting parameter or a signal source input port switching parameter of the OSD menu function, though the disclosure is not limited thereto. The various parameters of the OSD menu function are known by those skilled in the art, so that details thereof are not repeated. If the first image source is the microprocessor 50 in the internal of the display device 100 before the OSD menu function is triggered, after the OSD menu function is closed, the display circuit 30 controls the multiplexer 20 to return a usage right of the touch screen controller 40 to the microprocessor 50. If the first image source is the external host 70 before the OSD menu function is triggered, after the OSD menu function is closed, the display circuit 30 controls the multiplexer 20 to return the usage right of the touch screen controller 40 to the external host 70.

In an embodiment, if the first image source is the microprocessor 50 in the internal of the display device 100 before the OSD menu function is triggered, and if the user changes the signal source input port switching parameter through the OSD menu function, after the OSD menu function is closed, the display circuit 30 controls the multiplexer 20 to switch the usage right of the touch screen controller 40 to the external host 70.

When the first image source is the microprocessor 50, the first image of the microprocessor 50 can be transmitted to the external host 70 through the multiplexer 20, and the external host 70 and the multiplexer 20 can be connected through a universal serial bus (USB); or the first image of the microprocessor 50 is transmitted to the external host 70 through a USB controller (not shown); or the first image of the microprocessor 50 is transmitted to the external host 70 through a wireless device (not shown), though the disclosure is not limited thereto. Certainly, the external host 70 can also transmit video data to the display circuit 30 through a cable or wireless network device (not shown) for playing. The external host 70 may have an operating system, for example, the Microsoft Windows operating system or the Apple operating system, though the disclosure is not limited thereto.

It should be noticed that in the normal display mode, a usage right of the display circuit 30 in a touch interface is handed to a computing platform according to an initial configuration of the system, where the computing platform refers to the microprocessor 50 or the external host 70. When the screen adjustment mode is entered, once the user finishes adjusting the parameters of the OSD menu and disables the OSD menu function, the usage right of the display circuit 30 is set to the computing platform. Alternatively, when the screen adjustment mode is entered for a predetermined time and the touch display panel 10 does not transmit any parameter-related second detection result det2 to the touch screen controller 40, the OSD menu function of the display circuit 30 is closed to enter the normal display mode, and the usage right of the display circuit 30 is set to the computing platform.

Moreover, the display device 100 can be applied to a smart TV or a smart monitor. When the display device 100 is the smart TV or the smart monitor, the display device 100 may have an Internet function or a set-up box to facilitate the user watching Internet videos of Youtube or TV programs. A wireless technique, for example, wireless fidelity (Wi-Fi) can be configured to the display device 100, though the disclosure is not limited thereto. The display circuit 30 can synchronously transmit or switch the received cable or wireless images and network signals to the external host 70 through USB or other manner.

Figure 2:
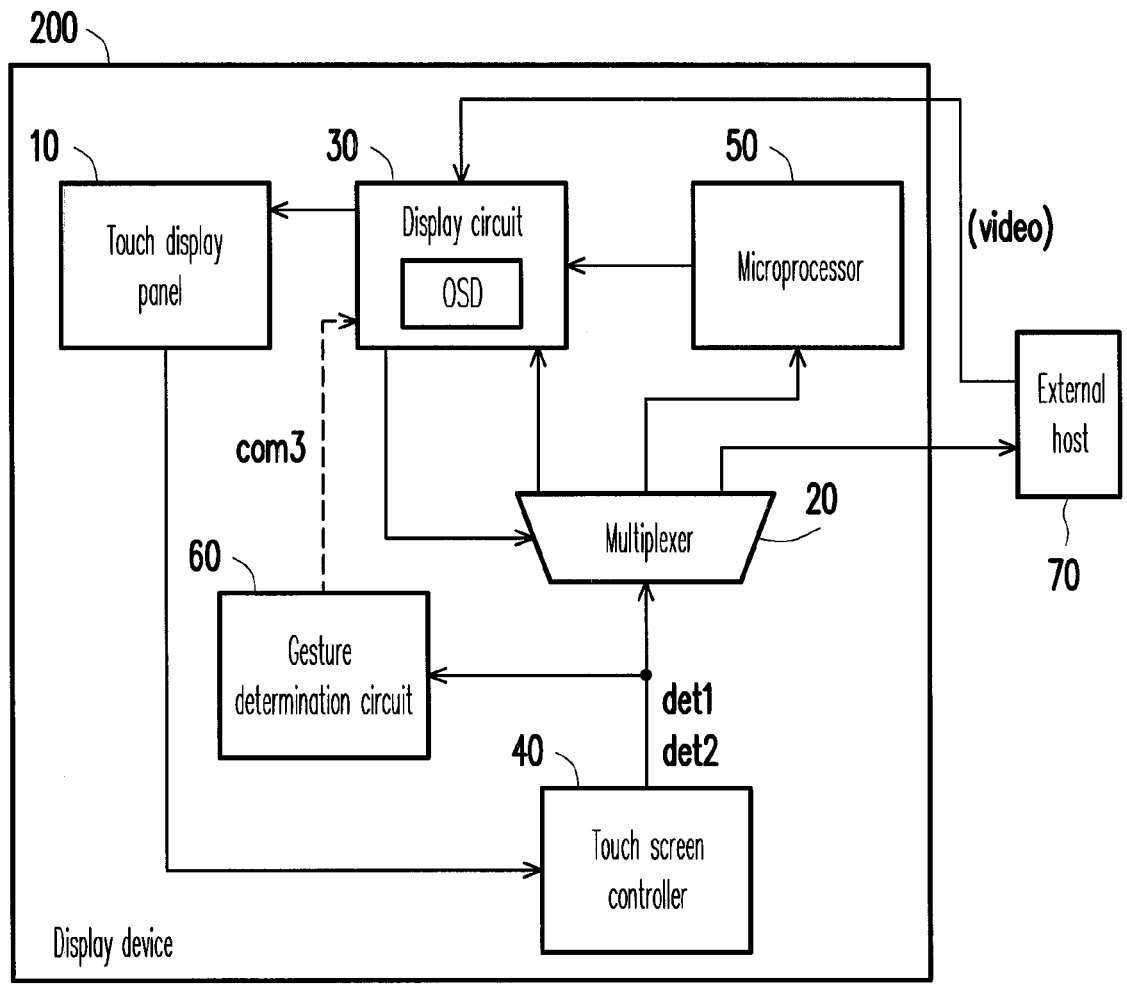
FIG. 2 is a block diagram of a display device according to another embodiment of the disclosure.

FIG. 2 is a block diagram of a display device according to another embodiment of the disclosure. Referring to FIG. 2, a structure of the display device 200 is similar to that of the display device 100, and a difference there between is that the microprocessor 50 or the external host 70 of the computing platform is unnecessary to determine whether the first detection result det1 complies with the predetermined pattern, and the display device 200 includes a gesture determination circuit 60.

The gesture determination circuit 60 is coupled between the display circuit 30 and the touch screen controller 40. The gesture determination circuit 60 is a physical circuit, which may include a logic circuit and a look-up table, though the disclosure is not limited thereto. The gesture determination circuit 60 determines whether the first detection result det1 complies with the predetermined pattern. If the first detection result det1 complies with the predetermined pattern, the gesture determination circuit 60 sends a command com3 to trigger the OSD menu function of the display circuit 30.

If it is required to switch the image of the first image source, the user can select the first image source of the display circuit 30 through the OSD menu for switching to the microprocessor 50 or the external host 70.

Figure 3:
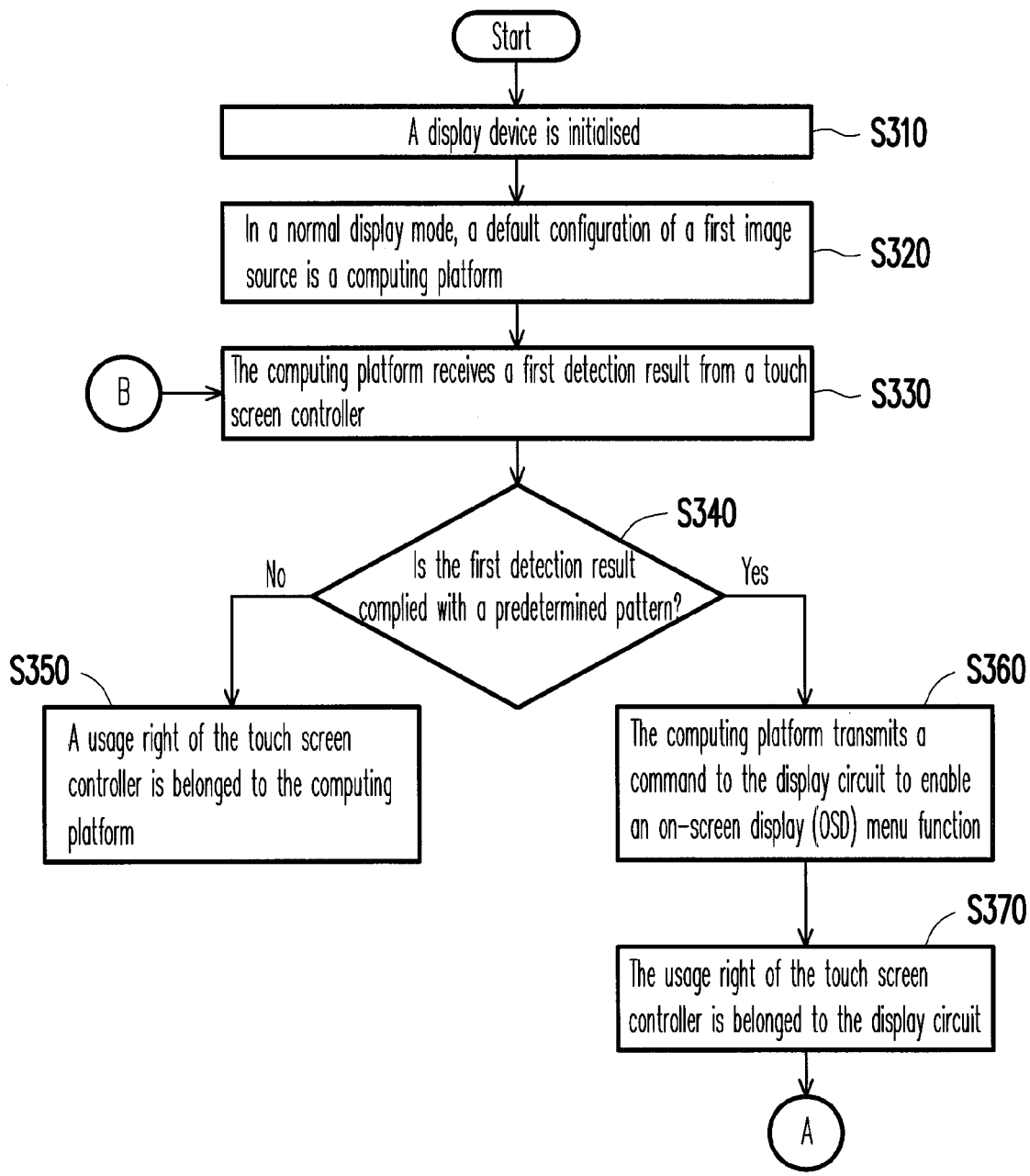
FIG. 3 and FIG. 4 are flowcharts illustrating an operation flow of a display device having an on-screen display (OSD) menu function according to another embodiment of the disclosure.
Figure 4:
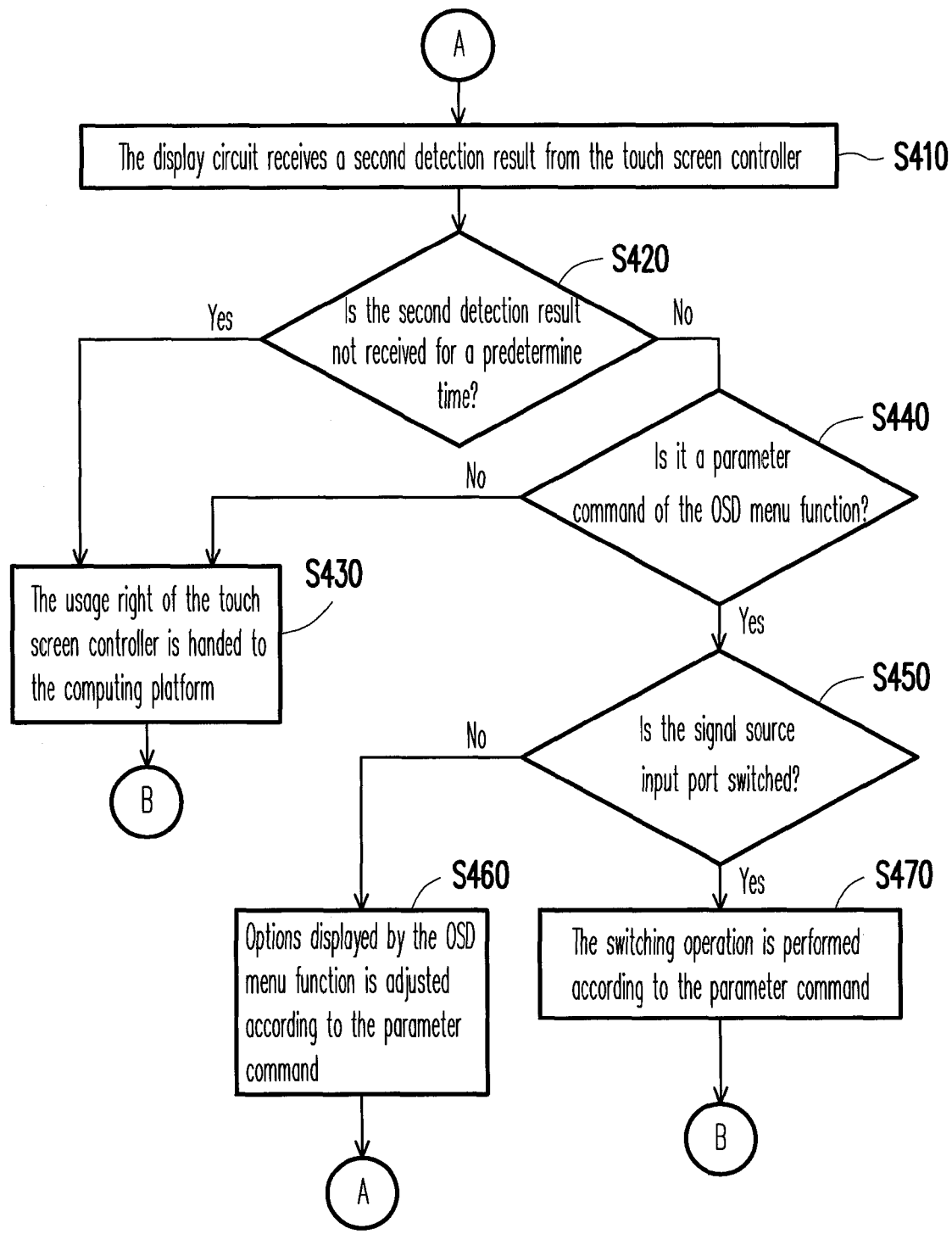

FIG. 3 and FIG. 4 are flowcharts illustrating an operation flow of a display device having the OSD menu function according to another embodiment of the disclosure. Referring to FIG. 3 and FIG. 4, according to descriptions of the aforementioned embodiments, the operation of the display device of the present embodiment may include following steps.

The display device is initialised (step S310);

In a normal display mode, a default configuration of a first image source is set to a computing platform, where the computing platform can be a microprocessor built in the display device or an external host (step S320);

The computing platform receives a first detection result from a touch screen controller (step S330);

The microprocessor or the external host of the computing platform determines whether the first detection result complies with a predetermined pattern (step S340);

If not, a usage right of the touch screen controller is still belonged to the computing platform (step S350);

If yes, the computing platform transmits a command to the display circuit to enable the OSD menu function (step S360);

The usage right of the touch screen controller is belonged to the display circuit (step S370), and a screen adjustment mode is entered (step A);

The display circuit receives a second detection result from the touch screen controller (step S410);

It is determined whether the second detection result is not received for a predetermine time (step S420);

If the second detection result is not received, the usage right of the touch screen controller is handed to the computing platform (step S430), and the normal display mode is entered (step B), and then the step S330 is resumed;

If the second detection result is received, it is determined whether it is a parameter command of the OSD menu function, where the parameter command is to adjust a brightness parameter, a contrast parameter, an image position adjusting parameter, a color parameter, a display frequency adjusting parameter or a signal source input port switching parameter of the OSD menu function (step S440);

If it is not the parameter command of the OSD menu function, the step S430 is executed;

If it is the parameter command of the OSD menu function, it is determined whether the signal source input port is switched (step S450);

If it is not to switch the signal source input port, options displayed by the OSD menu function are adjusted according to the parameter command (step S460), and after the adjustment, the screen adjustment mode is entered (step A), and then the step S410 is resumed; and If the signal source input port is switched, the switching operation is performed according to the parameter command (step S470), and after the switching operation, the normal display mode is entered (step B), and then the step S330 is resumed.

In summary, the display device of the disclosure triggers the OSD menu function of the display circuit according to the detection result of the touch display panel to enter the screen adjustment mode, and sets various parameters of the OSD menu function according to the detection result of the touch display panel, so that configuration of OSD physical keys is unnecessary. Therefore, the operation flow is simplified, and operation inconvenience is avoided. In this way, the physical keys are reduced to simplify a fabrication flow, and hardware space and fabrication cost are saved.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A display device having an on-screen display (OSD) menu function, comprising:
    a touch display panel, comprising a display layer and a touch layer;
    a touch screen controller, coupled to the touch display panel to detect the touch layer, and outputting a first detection result;
    a display circuit, coupled to the touch display panel to display a first image of a first image source on the display layer, wherein the display circuit has the OSD menu function; and
    a multiplexer, coupled between the display circuit and the touch screen controller,
    wherein in a normal display mode, the multiplexer transmits the first detection result of the touch screen controller to the first image source, when the first detection result complies with a predetermined pattern, the OSD menu function of the display circuit is triggered to enter a screen adjustment mode, and the multiplexer transmits the first detection result of the touch screen controller to the display circuit.

2. The display device having the OSD menu function as claimed in claim 1, wherein the first image source is an external host, and in the normal display mode, the external host receives the first detection result of the touch screen controller through the multiplexer and provides the first image, when the first detection result complies with the predetermined pattern, the external host sends a command to trigger the OSD menu function of the display circuit.

3. The display device having the OSD menu function as claimed in claim 2, wherein in the screen adjustment mode, the display circuit triggers a parameter command according to a second detection result output by the touch screen controller, so as to adjust options displayed by the OSD menu function or select to display the first image of the first image source or a second image of the external host on the display layer.

4. The display device having the OSD menu function as claimed in claim 3, wherein the parameter command is to adjust a brightness parameter, a contrast parameter, an image position adjusting parameter, a color parameter, a display frequency adjusting parameter or a signal source input port switching parameter.

5. The display device having the OSD menu function as claimed in claim 2, wherein in the screen adjustment mode, when the display circuit learns that a user does not touch the touch display panel for a predetermined time according to a second detection result output by the touch screen controller, the display circuit closes the OSD menu function to enter the normal display mode.

6. The display device having the OSD menu function as claimed in claim 1, further comprising:
    a microprocessor, coupled to the display circuit to serve as the first image source,
    wherein in the normal display mode, the microprocessor receives the first detection result of the touch screen controller through the multiplexer and executes an operating system to provide the first image, and when the first detection result complies with the predetermined pattern, the microprocessor sends a command to trigger the OSD menu function of the display circuit.

7. The display device having the OSD menu function as claimed in claim 1, further comprising:
a microprocessor, coupled to the display circuit to serve as the first image source,
wherein the display circuit selects to display the first image of the first image source or a second image of an external host on the display layer, in the normal display mode, when the display circuit selects to display the first image on the display layer, the microprocessor receives the first detection result of the touch screen controller through the multiplexer and executes an operating system to provide the first image, and in the normal display mode, when the display circuit selects to display the second image on the display layer, the external host receives the first detection result of the touch screen controller through the multiplexer and provides the second image.

8. The display device having the OSD menu function as claimed in claim 7, wherein in the screen adjustment mode, the display circuit triggers a parameter command according to a second detection result output by the touch screen controller, so as to adjust options displayed by the OSD menu function or select to display the first image of the first image source or the second image of the external host on the display layer.

9. The display device having the OSD menu function as claimed in claim 8, wherein the parameter command is to adjust a brightness parameter, a contrast parameter, an image position adjusting parameter, a color parameter, a display frequency adjusting parameter or a signal source input port switching parameter.

10. The display device having the OSD menu function as claimed in claim 7, wherein in the screen adjustment mode, when the display circuit learns that a user does not touch the touch display panel for a predetermined time according to a second detection result output by the touch screen controller, the display circuit closes the OSD menu function to enter the normal display mode.

11. The display device having the OSD menu function as claimed in claim 1, further comprising:
a gesture determination circuit, coupled between the touch screen controller and the display circuit, for determining whether the first detection result complies with the predetermined pattern,
wherein when the first detection result complies with the predetermined pattern, the gesture determination circuit sends a command to trigger the OSD menu function of the display circuit.

12. The display device having the OSD menu function as claimed in claim 11, further comprising:
a microprocessor, coupled to the display circuit to serve as the first image source,
wherein the display circuit selects to display the first image of the first image source or a second image of an external host on the display layer, in the normal display mode, when the display circuit selects to display the first image on the display layer, the microprocessor receives the first detection result of the touch screen controller through the multiplexer and executes an operating system to provide the first image, and in the normal display mode, when the display circuit selects to display the second image on the display layer, the external host receives the first detection result of the touch screen controller through the multiplexer and provides the second image.

13. The display device having the OSD menu function as claimed in claim 12, wherein in the screen adjustment mode, the display circuit triggers a parameter command according to a second detection result output by the touch screen controller, so as to adjust options displayed by the OSD menu function or select to display the first image of the first image source or the second image of the external host on the display layer.

14. The display device having the OSD menu function as claimed in claim 13, wherein the parameter command is to adjust a brightness parameter, a contrast parameter, an image position adjusting parameter, a color parameter, a display frequency adjusting parameter or a signal source input port switching parameter.

15. The display device having the OSD menu function as claimed in claim 12, wherein in the screen adjustment mode, when the display circuit learns that a user does not touch the touch display panel for a predetermined time according to a second detection result output by the touch screen controller, the display circuit closes the OSD menu function to enter the normal display mode.

16. The display device having the OSD menu function as claimed in claim 1, wherein in the screen adjustment mode, the display circuit triggers a parameter command according to a second detection result output by the touch screen controller, so as to adjust options displayed by the OSD menu function or select to display the first image of the first image source or a second image of an external host on the display layer.

17. The display device having the OSD menu function as claimed in claim 16, wherein the parameter command is to adjust a brightness parameter, a contrast parameter, an image position adjusting parameter, a color parameter, a display frequency adjusting parameter or a signal source input port switching parameter.

18. The display device having the OSD menu function as claimed in claim 1, wherein in the screen adjustment mode, when the display circuit learns that a user does not touch the touch display panel for a predetermined time according to a second detection result output by the touch screen controller, the display circuit closes the OSD menu function to enter the normal display mode.

19. The display device having the OSD menu function as claimed in claim 1, wherein the display device is a smart television (TV) or a smart monitor having an Internet function.

* * * * *